Oct. 14, 1969 J. H. BLOSSOM 3,472,965

TIME-TONE DATA TRANSMISSION SYSTEM

Filed April 11, 1966 10 Sheets-Sheet 1

INVENTOR.
JAMES H. BLOSSOM

BY

Owen, Wickersham & Erickson
ATTORNEYS

Oct. 14, 1969 J. H. BLOSSOM 3,472,965

TIME-TONE DATA TRANSMISSION SYSTEM

Filed April 11, 1966 10 Sheets-Sheet 2

INVENTOR
JAMES H. BLOSSOM

BY

Owen, Wickersham & Erickson
ATTORNEYS

Oct. 14, 1969 J. H. BLOSSOM 3,472,965

TIME-TONE DATA TRANSMISSION SYSTEM

Filed April 11, 1966 10 Sheets-Sheet 3

INVENTOR
JAMES H. BLOSSOM
BY
Owen, Wickersham & Erickson
ATTORNEYS

INVENTOR.
JAMES H. BLOSSOM
BY
Owen, Wickersham & Erickson
ATTORNEYS

INVENTOR.
JAMES H. BLOSSOM
BY
Owen, Wickersham & Erickson
ATTORNEYS

TONE DETECTOR CIRCUIT

INVENTOR
JAMES H. BLOSSOM
BY
Owen, Wickersham & Erickson
ATTORNEYS

INVENTOR
JAMES H. BLOSSOM
BY
Owen, Wickersham & Erickson
ATTORNEYS

INVENTOR
JAMES H. BLOSSOM
BY
Owen, Wickersham & Erickson
ATTORNEYS

Oct. 14, 1969 J. H. BLOSSOM 3,472,965

TIME-TONE DATA TRANSMISSION SYSTEM

Filed April 11, 1966 10 Sheets-Sheet

INVENTOR.
JAMES H. BLOSSOM
BY
Owen, Wickersham & Erickson
ATTORNEYS

TIME-TONE DATA TRANSMISSION SYSTEM

Filed April 11, 1966 10 Sheets-Sheet 10

INVENTOR.
JAMES H. BLOSSOM
BY
Owen, Wickersham & Erickson
ATTORNEYS

United States Patent Office 3,472,965

Patented Oct. 14, 1969

3,472,965

TIME-TONE DATA TRANSMISSION SYSTEM

James H. Blossom, Amarillo, Tex., assignor, by mesne assignments, to Ped Inc., Dallas, Tex., a corporation of Texas Filed Apr. 11, 1966, Ser. No. 541,759
Int. Cl. H04m *11/00*
U.S. Cl. 179—2 23 Claims

ABSTRACT OF THE DISCLOSURE

A method for transmitting multi-tone signal bursts from a transmitting station to a receiver station on a voice frequency facility with a high degree of signal to noise immunity comprising the steps of transmitting a multi-tone signal burst comprised of a plurality of synchronizing signals of a predetermined frequency, time duration and time separation, transmitting information signals between said synchronizing signals that have a different frequency than said synchronizing signals, and at a reception unit, detecting said synchronizing and information signals, decoding said signals to produce an output control signal while simultaneously comparing the level of each of said synchronizing and information signals with other signals detected simultaneously therewith and producing a predetermined error indication at the receiver unit when one of said synchronizing signals is not a predetermined value greater than the amplitude of any other signals detected simultaneously therewith.

This invention relates to a system for controlling, operating, interrogating or monitoring apparatus, equipment or the like, located at stations that are remote from a central control station.

It provides a unique yet reliable and practical remote control system adaptable to a wide variety of industries and to the management and control of manufacturing process, utilities and agricultural facilities. For example, it can be employed to control from a remote central station the starting and stopping of motors, the positioning of switches and valves, the transmission of digital data and the manipulation of actuation of various other mechanical and electrical devices. Its use not only provide economic advantages by reducing or eliminating the labor heretofore required at a large number of separate operating stations, but it also assures reliable and accurate operation by consolidating control at a central station where various functions and data can be programmed and coordinated.

One object of my invention is to provide a remote control system of the aforesaid type that can utilize conventional radio or wire voice frequency communication circuits normally used for dispatching or for other such intermittent voice frequency type service. Moreover, it is an object to provide such a remote control system that can share time with such conventional or normal voice frequency transmission circuits while they remain in service and without interrupting or interfering with their normal use. Further, it is an object to provide a system that will operate reliably without false operation from the normal energy of speech on the circuit or by extraneous voice or noise factors.

Still another object of my invention is to provide a remote control system of the aforesaid general type which provides a high degree of security and is also relatively inexpensive to construct, install, and also easy to maintain with a minimum of unskilled labor. The unique arrangement and combination of elements of my system enables it to be readily expanded to service more facilities or control points without entailing extensive addition of complicated equipment.

Another object of the present invention is to provide a command control system that can transmit control data signals to remotely located apparatus or equipment at remote stations and transmit status data back from such stations all by means of a time and frequency encoding and decoding method that provides a high degree of reliability and security from false operation.

The foregoing and other objects of my invention are accomplished by a system wherein the control signals to a remote station from a central command station or the status reporting signals being sent back from a remote station are formed sequentially in a predetermined time and frequency coded arrangement and are sent as a relatively short multi-tone burst. At the reception stations the equipment or apparatus to which the transmission is directed will not respond unless the multi-tone transmission burst received has the correct preselected time and frequency relationship. Thus, at the control or transmission station means are provided for producing synchronizing tone bursts at predetermined time spaced intervals thereby forming time slots. In conjunction therewith a stepping means operates to place in each time slot a particular tone of a preselected frequency. The tones used are preferably coded to relate to digits from one to ten so that the system is decennary and thus compatible with existing decimal type readout and display components. In a full multi-tone burst, the tones in a first group of time slots may be utilized to provide an address identification, and the remaining time slots can be utilized for the tones providing the function signal. At the reception station the multi-tone burst is received and the equipment is turned on and responds when its predetermined address signal is received. However, the synch tones transmitted must also be received in order to operate a similar stepping means at the reception station that directs the function tones to the proper preselected detector circuits. Unless all of the tones of a burst that are received are the proper preselected frequency and in the coded order the control equipment connected to the reception station will not operate. This provides a security heretofore unavailable in remote control systems.

Another important advantage of my invention is its inherent flexibility and adaptability to various modes of operation. Not only can it be applied as a transmission only system to send control signals to a large plurality of operating stations, but the principles of the invention can be utilized to combine a status reporting or verification of actuation at the various operating stations. The following description includes representations of these various modes which all embody the principles of the invention.

Other objects, advantages and features of the invention will become apparent from the following detailed description and the accompanying drawings, in which.

General

Figure 1:
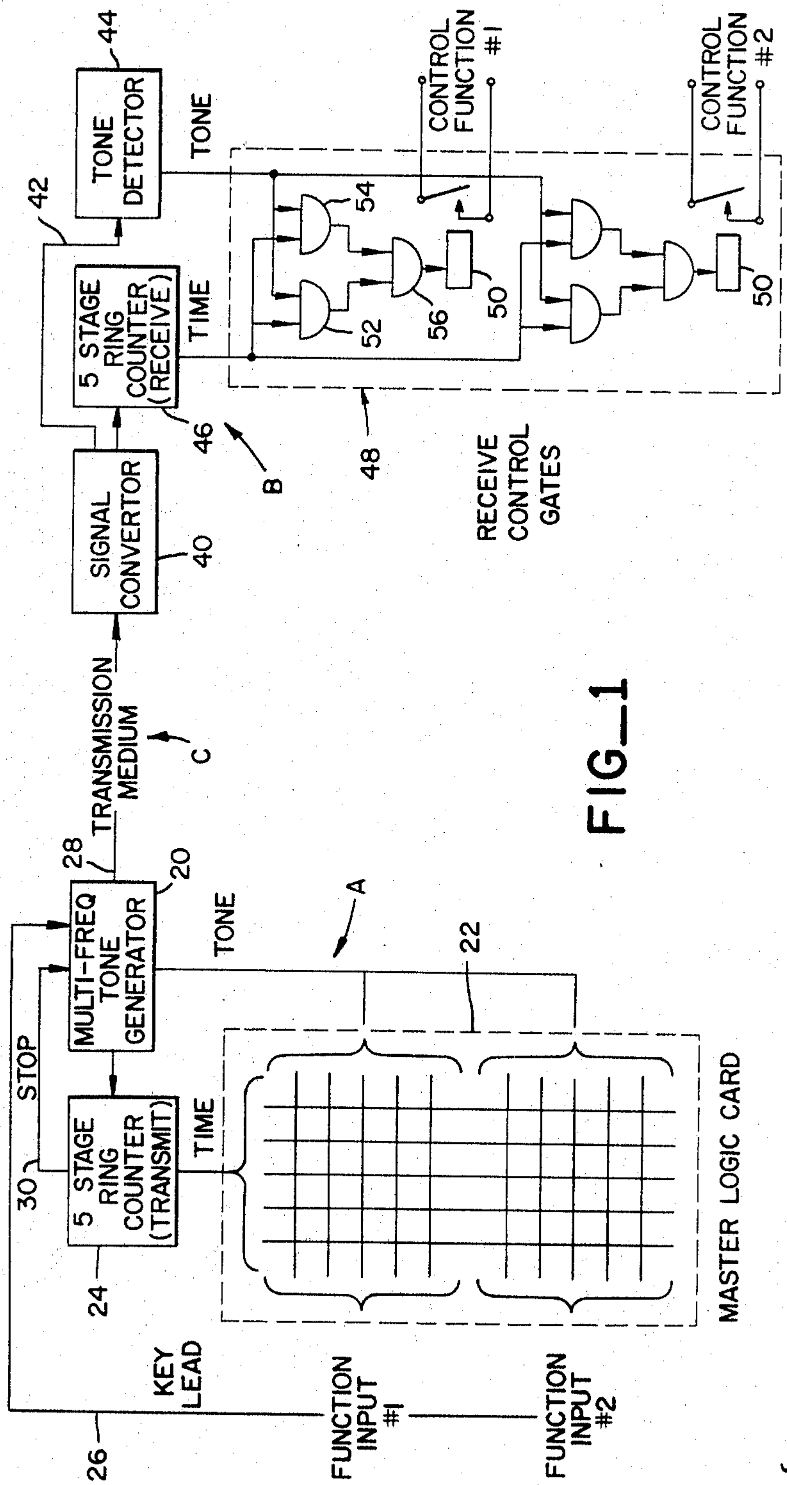
FIG. 1 is a block diagram schematic showing the command transmission mode of a system embodying the principles of the present invention.

With reference to the drawing, FIG. 1 illustrates broadly the apparatus and method of the present invention for transmitting information or control signals in the form of relatively short bursts of multi-frequency tone over a conventional in-service voice frequency transmission facility. As represented in block diagram and schematic form, the system comprises a transmission command station A and a reception station B located near the equipment or apparatus being remotely controlled, both stations being connected at spaced apart locations to the voice frequency facility C. At the transmitting control station A a twelve-tone generator 20 is provided which is capable of transmitting only one tone at a time. Ten of the tones produced by the tone generator are assignable to either addresses or functions for remote operating stations and the other two tones are utilized as synchronizing (synch) tones.

In the embodiment of the invention shown and described as a basic decennary tone system for addresses or functions is utilized because of its adaptability to serial decimal readout. This makes it usable with most simple decimal printer readout devices without further decoding or processing when each of the ten tones is assigned a digit from one to ten.

An important feature of my system for transmission of control signals over a voice frequency facility is that it provides for encoding and decoding information on the basis of time and frequency division. The tone generator 20 is operable to produce the synch tone signal at predetermined spaced apart intervals, such intervals between synch tones being referred to as time slots. Thus, in each multi-tone "burst" or "series" of information transmitted by the transmission station A, a given function signal, that is, one of the ten tones, is assigned to a particular time slot. The tones for any desired transmission may be programmed or selected by various command selector means designated by the numeral 22, such as a master logic card of a five-row decimal type parallel keyboard. Connected to the command selector means 22 is a stepping means such as a five stage ring counter 24 which is also connected to the multi-tone generator circuit 20. The output of the ring counter can be programmed through the selector means 22 to key on any of the ten function tones. Application of a positive pulse to a key lead 26 will start the command transmission sequence causing the tone generator 20 to produce an initial prolonged burst of synch tone followed by five selected tones spaced between an equal number of synch tones by the ring counter. The output 28 of the tone generator is connected directly to the voice frequency facility C which may be a telephone line or a radio transmitter. At the end of this transmission sequence, the ring counter 24 will transmit a negative pulse back to the tone generator keying circuit through a lead 30. This will turn the equipment at station A off and make it ready for the next command transmission.

Figure 1A:
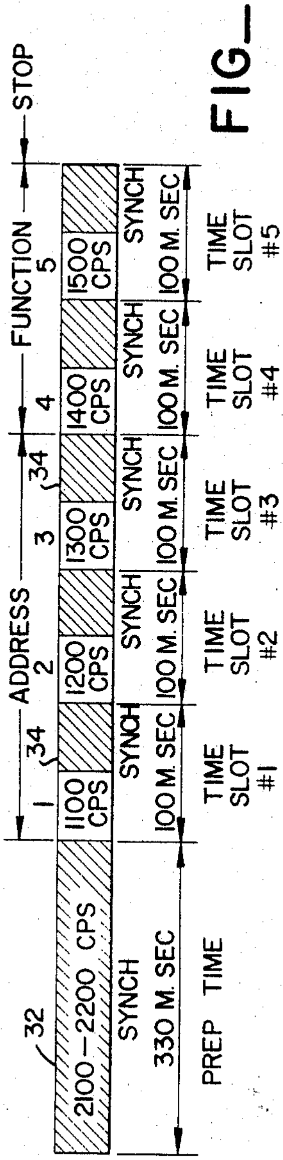
FIG. 1A is a graphical representation of a multitone signal burst transmitted in accordance with principles of the invention.

An entire signal "burst" could have any number of time slots, although its length is limited as a practical matter to around one second, so as not to interfere with the normal voice transmission. A graphical representation of a typical command signal "burst" or sequence that is time-frequency coded in accordance with the present invention as just described, is shown in FIG. 1A. In this example, the initial synch burst 32 has a length in the order of 330 milliseconds. The remaining synch tones designated by the numeral 34 are 50 milliseconds in length and are spaced to form 50 millisecond time slots. Transmitted in each of five time slots is a preselected tone having a different frequency, the first three tones in the time slots 1, 2 and 3, being for address identification of the reception station and the latter two tones in the time slots 4 and 5, being function signals to produce the desired result.

At the remote reception station B the apparatus of my system comprises a signal converter 40 connected by a lead 42 to a synch tone detector 44, the latter being adapted to turn on power to the rest of the circuits when the initial synch tone burst 32 is received through the connected voice frequency facility C. The signal converter 40 is connected to a five-stage ring counter 46 similar to the one at the transmission station A which operates to step in response to the trailing edge of each synch tone. The ring counter 46 and the tone detector 44 are both connected to a plurality of receive control gates 48 and the output of each gate is connected to a control relay 50 connected in a circuit that provides the control function to a device being remotely controlled.

Each receive control gate 48 is connected in what amounts to a four input "and" circuit which includes two preliminary gates 52 and 54. The reception of the proper tone in time slot four at the first gate circuit 52, together with the synch tone, arms the circuit. Then, proper tone reception in time slot five with the synch tone actuates a second gate circuit 54. Outputs from the gates 52 and 54 provide inputs to a third gate circuit 56 which then produces an output that actuates the control relay 50.

In order for a five time slot burst as shown in FIG. 1A to initiate a control function, the complete ten bit code including the five synch tones must be received in the proper time sequence with the proper timing of events before a control function will be initiated. Lack of proper information will not cause false operation of equipment but will merely cause the reception equipment to turn off and thereby require reinitiation of the command function.

In the present invention there are several considerations having to do with the security of control functions which are not evident from the above description but will be more apparent later on. The time-tone coincidence circuitry in the address function is designed in such a way that receipt of an improper address will stop the ring counter at the stage in which the lack of coincidence occurred and prevent it from stepping to the end of the chain, a condition which is required before a control function will actuate.

Having now described the invention in its broad aspects, various modes of its operation and the arrangement or circuitry of apparatus embodiments will be described in greater detail.

The transmission station A

Figure 2:
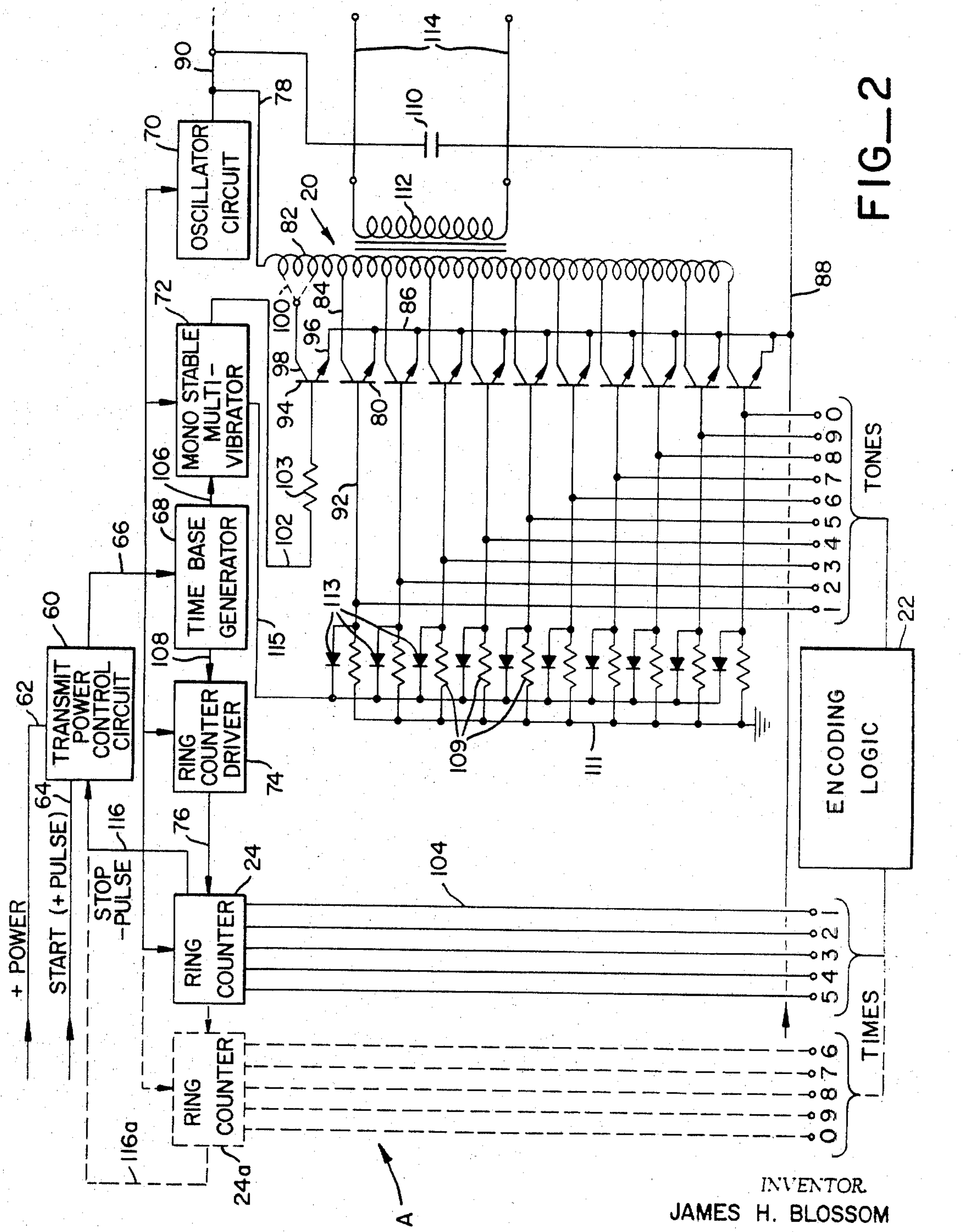
FIG. 2 is a more detailed schematic diagram of the transmision unit for my remote controy system.

The transmitter unit A shown in block diagram form in FIG. 2 comprises generally a power control circuit indicated as block 60 which is connected to a source of operating voltage (e.g., 10 volts) by a lead 62 and a separate lead 64 connected to another source of power for starting the apparatus. This power control circuit is essentially a switching device which is capable of applying power to the circuitry of the transmitter unit when it is desired to initiate a signal transmission cycle or signal burst. It can be actuated either by manual or automatic switching from the power source, or it may be constructed to react to a pulse signal from a pair of function contacts in a report back or status report mode, as will be seen later.

Connected to the power control circuit 60 by a lead 66 is a time base generator 68 for producing a series of equally time spaced synch pulses which serve to establish time slots and thus provide time synchronization for the control command signal transmission system. The power control circuit is also connected to an oscillator circuit 70, a monostable multivibrator 72, a ring counter driver 74, and the ring counter 24. The ring counter driver 74 is also directly connected to the ring counter 24 by a lead 76. Another ring counter 24 is shown in dotted lines connected to the ring counter 24 and to the power control circuit to illustrate how additional ring counter stages can be utilized if desired.

Since ring counters are well known in the art, its circuit is not shown in detail here. Essentially it comprises a series of interconnected switching type circuits which are so arranged that only one of the switching circuits can be turned on at a time and are further so connected that they will turn on only in serial sequence. Other stepping means could be utilized within the scope of the invention, but a ring counter is preferable because of its inherent simplicity, reliability and ability to step at a high rate.

Connected to the oscillator circuit 70 by a lead 78 is the tone generator 20 for producing the tone signals of different frequencies and for selecting the particular frequency which is to be transmitted in a preselected time slot. In the form shown, it is essentially an electronic tap switch comprising an inductance-capacitance circuit and utilizing a plurality of transistors 80 to provide the switching functions at taps along the coil which are located to provide the desired tone frequencies. Any number of tone signals of the desired frequencies can be produced by this generator depending on the circuitry used, but for the reasons previously set forth a decennary system is preferred which provides ten tone signals of different frequencies. Along a tap coil 82, each of the NPN type transistors 80 is connected by a lead 84 on its collector terminal to a tap which is located to produce a certain tone frequency. The emitters of each transistor 80 are all connected to a lead 86 that in turn is connected to a common ground lead or negative power lead 88. The base leads 92 of all the transistors 80 are connected to the logic encoding device 22. Another NPN type transistor 94 which serves as a synch tone switch is connected by its emitter 96 to the negative power lead 86 and by its collector 98 to the coil 82 through alternate leads 100 of a switch shown in dotted lines and connectable at different tap locations on the coil. This enables the tone generator 20 to provide a synch tone of either of two different frequencis. Since the system is set up for simplex operation, the latter two synch tone frequencies may be utilized to identify the direction in which the transmission is going. The base of the synch tone transistor 94 is conncted by a lead 102 to the output of the multivibrator 72.

To describe now the operation of the transmitter unit A, it may be assumed that the encoding logic has been established. That is, a preprogrammed selection of times and tones have been interwired through a programming board, a keyboard or some other means indicated by the encoding logic block 22 such that the oscillator tone circuits, through the transistor base leads 92 have been connected to the time outputs of the ring counter 24 through their output leads 104. In FIG. 2, the digit code numbers assigned to these various leads are so indicated. Now, a positive pulse on the start lead 64 into the transmit power control circuit 60 will cause power to be applied through the lead 66 to the oscillator circuit 70, the multivibrator 72, the time base generator 68, the ring counter driver 74 and the ring counter 24 (and **24*a*, if used). The application of voltage on lead 66 will cause the time base generator 68 to perform a pulsing function at approximately 10 cycles per second. Any suitable pulsing device could be used here, one preferred form being an unijunction relaxation oscillator. The output lead 106 from the time base generator connected to the monostable multivibrator 72 will cause it to apply a positive voltage pulse through the lead 102 and a resistor 103 to the base of the transistor 94. As the transistor 94 conducts during this pulse it causes the oscillator circuit 70 to put out a pulse of synch tone. These synch pulses are of approximately 50 milliseconds duration with a 50 millisecond interval between them. In the period during which synch tone is not being transmitted, the output in a lead 108 from the time base generator 68 is applied to the ring counter driver 74 which through its output lead 76 will cause the ring counter 24 to step from one stage to the next. This causes a series of positive pulses to appear sequentially on the output leads 104 in step with the synchronizing tone. Therefore, between each succeeding burst of synch tone, a preprogrammed function tone derived from the encoding logic will be keyed on by one of the transistor switches 80 because of the appearance of a positive pulse from one of the ring counter output leads 104. The transistor switches 80 in effect constitute an electronically derived tap switch so that a positive applied pulse to any particular base lead 92, will in effect connect that tap of the coil 82 to the common circuit and thereby produce a tone of a specific frequency. Each of the base leads 92 of the tone-generator-transistor switches 94 is connected through a resistor 109 to a common ground line 111 and through a diode gate 113 connected in parallel to a common lead 115 connected to the multivibrator 72. The latter serve to hold off function tones and all other tones while a synch tone is being transmitted. The output of the resonant oscillator circuit 70, the coil 82 and a capacitor 110 in the power lead 88 is coupled through a winding 112 to a pair of output leads 114** which are applied to whatever voice frequency communications facility is being utilized for the system. If the facility were telephone transmission lines, these leads would be coupled to a telephone cable pair, and if the facility were radio they would be coupled to the microphone input.

During a transmission cycle the time-tone, interlocked coded series of multi-tone signals will continue through all of the connected time slots, the number of time slots being dependent upon the number of ring counter stages being used. The final pulse of the final ring counter is applied through a lead 116 (or **116*a*) as a negative pulse to the transmit power control circuit 60**. This turns off the transmit power control circuit and removes power from the associated equipment.

Figure 3:
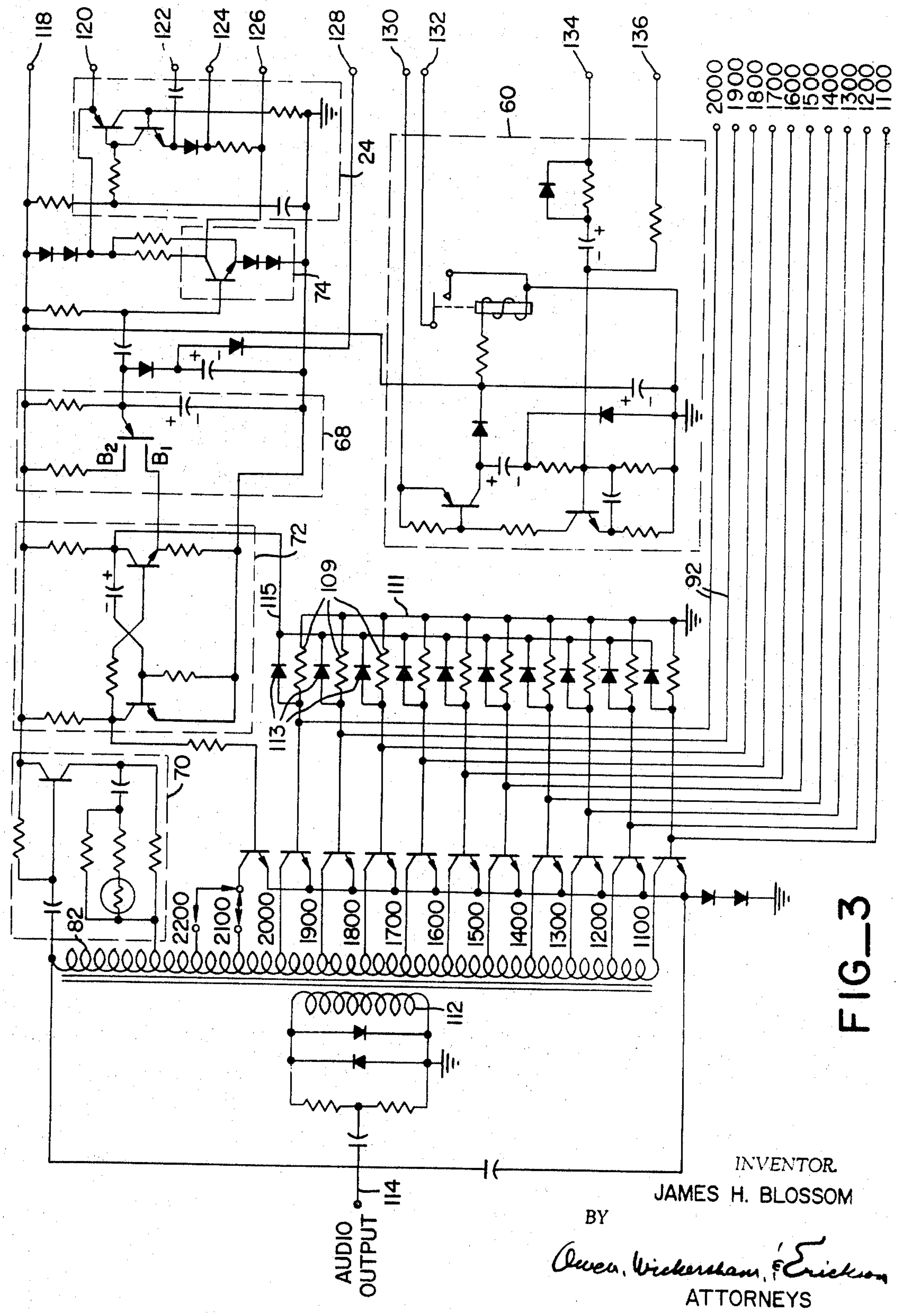
FIG. 3 is a diagram showing typical circuit details for the transmission unit of FIG. 2.

A typical detailed circuit diagram for the transmission mode is shown in FIG. 3. The combination of components according to the invention lends itself to a circuit utilizing solid state elements as shown, which can be readily connected and packaged in compact fashion. Since the flow of current and the operation of individual components is conventional in this circuit it will not be traced here in order to conserve space.

In FIG. 3, the components comprising the block units shown in FIG. 2 are enclosed in dotted lines for clarification. The elements within the dotted block 24 of FIG. 3 comprise only the ring-counter preset portion of the entire ring-counter. The terminals shown at the right of the diagram are identified typically as follows: terminal 118, called "switched plus," is interconnected to the associated transmit ring counter to supply positive operating potentials for the ring counter stages. Terminal 120, called "bias," is interconnected to the associated transmit ring counter to furnish offset operating bias voltage for the emitters of PNP transistors in the ring counter, assuring turn-off of each stage as required. Terminal 122, called "reset," is used to reset the preset stage for recycling the transmit ring counter when applications require more than five time slots (obtained through use of a scanner card). The "reset" negative pulse is derived from the "step/stop" terminal of the transmit ring counter and in effect completes the ring to cause the ring counter to recirculate or recycle. Terminal 124, called "step," supplies a negative pulse to the transmit ring counter input (address #1) to cause the first stage to turn on and establish the first time slot. This occurs at the end of the 330 millisecond preparatory time period. Terminal 126, called "read," supplies positive pulses to the transmit ring counter stages in parallel to turn off the stage that is in conduction. These pulses occur at the end of each synch pulse. Terminal 128, called "recycle," accepts a negative pulse from the scanner to delay the restart of the time base oscillator approximately .5 second after each group of five time slots. This delay is required to allow digital printers time for their print cycle. In operation, five digits are entered into the printer and then a print command causes the actual printing and line space advance, before the next line of digits is entered. Terminal 130 is the input terminal for positive 10-volt DC supply from the voltage regulator. Terminal 132, called "TX key," is an output terminal for the purposes of keying, or turning on, the radio transmitter or other communications equipment (not shown). This terminal supplies a ground through a relay contact during the transmitting period. Terminal 134 is called "stop." Once the power switch 60 has turned on, it will remain on for approximately 3 seconds or until signalled to turn off. This lead accepts a 100 millisecond positive pulse from the transmit ring counter step/stop terminal 124. The trailing edge of the pulse is negative going and signals the power switch 60 to turn off at the end of the last time slot of the transmission. Terminal 136, called "key in," is the input terminal for initiating transmissions. A positive pulse at this lead actuates the power switch 60 to turn on and start the transmission.

The reception unit B

Figure 4:
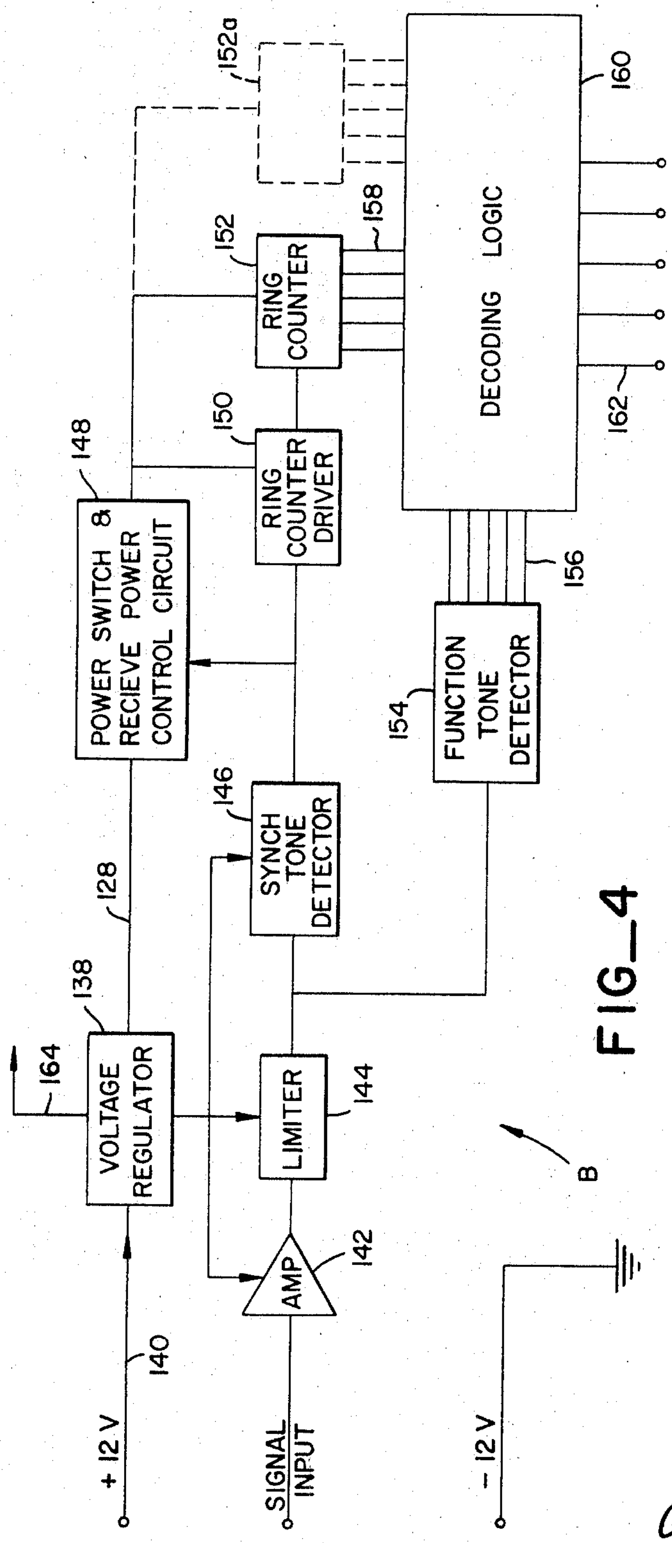
FIG. 4 is a schematic diagram of the reception unit for my remote control system.

The block diagram for the reception unit B of my system which is located near the equipment that is to be operated remotely by it is shown in FIG. 4. Generally, this reception unit comprises a voltage regulator 138 which receives direct current power (e.g., 12 volts on a lead 140) from a suitable source and is connected to an amplifier 142, a limiter 144, and a synch tone detector 146. The regulator is also connected to a power switch and a receive power control circuit 148 which in turn is connected to a ring counter driver 150 and one or more ring counters 152, depending on the number of time slots being used by the particular system. The amplifier 142, which receives the signal input, is connected to the limiter 144, which in turn is connected with the synch tone detector. A function tone detector board 154 is also connected to the limiter, and its output leads 156 together with the output leads 158 from the ring counters 152 are fed into a decoding logic circuit 160. The outputs 162 of the decoding logic circuit are connected to whatever devices (not shown) are being remotely controlled by the system. An unconnected lead 164 shown leaving the voltage regulator 138 is intended to supply power to transmitting circuitry (not shown) when the unit is used with status report equipment and the like.

Describing now the operation of this reception unit B, power is applied through the lead 140 to the series voltage regulator 138 which reduces the operating voltage of approximately 12 volts down to a closely regulated 10 volts. This regulated voltage is applied to the amplifier 142, the limiter 144 and the synch tone detector 146. Normally, these latter two component parts are always kept in an "on" condition as long as operating voltage is being applied. The received voice frequency tone signals being transmitted by the transmitting unit A are received, amplified and then are applied to the limiter 144, its output being connected to the synch tone detector 146 and also to the function tone detector board 154. The synch tone detector will detect the presence of synch tone bursts (e.g., 2,100 cycles) and when each burst of synch tone is detected, the synch tone detector produces a DC pulse with the cessation of each synch tone. These latter signals are applied to the received power control circuit 143 to activate it, and this circuit then feeds voltage to the ring counter driver 150 and the ring counters 152 (and 152*a*, if used). The output of the synch tone detector 146 provides a means for driving the ring counter driver 150, which in turn drives the associated ring counter 152 in such a manner that a positive pulse appears at its output leads 158 in sequence in accordance with the synch tone bursts. Therefore, the alternate bursts of synch tone being transmitted act to maintain the receive unit B in an operating condition so long as the synch tone bursts are appearing approximately every 50 milliseconds.

Figure 4A:
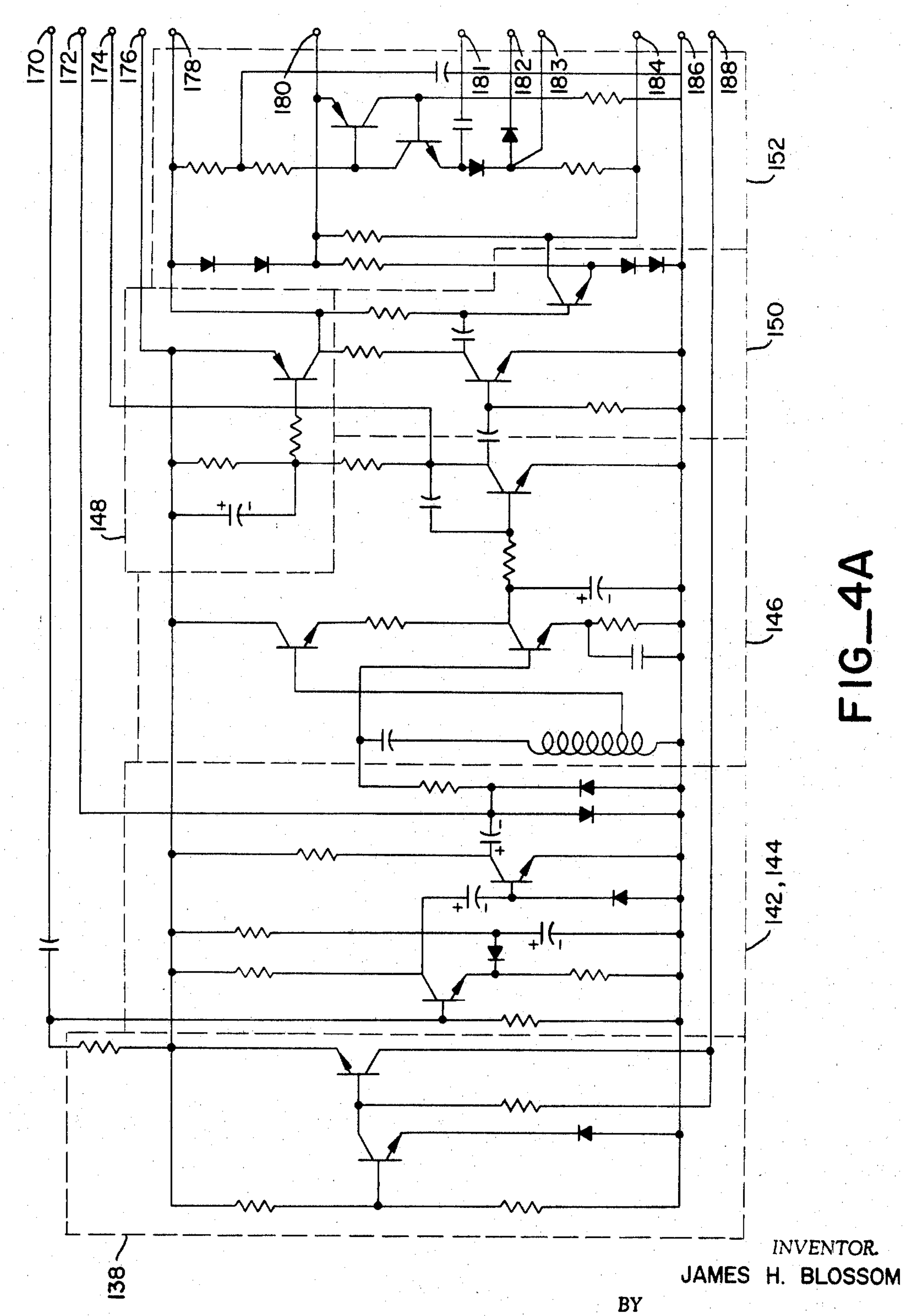
FIG. 4A is a diagram showing typical circuit details for the signal converter shown in FIG. 1.

A typical circuit diagram for the reception unit B, as previously described, is shown in detail in FIG. 4A. The components forming the units shown in the block diagram of FIG. 4 are enclosed by dotted lines and are numbered accordingly. This diagram represents one circuit arrangement for the reception unit using solid state components. Since the interconnection of the components shown is conventional and in accordance with well-known circuit principles it will not be traced here. At the right of the diagram are ten terminals which may be described as follows: terminal 170, called "audio in," is the input lead to the tone frequency amplifier 142, for connection to the radio receiver or other audio frequency receiving equipment. Terminal 172, called "audio out," is an output lead supplying level limited audio frequency signals to the function tone detectors. Terminal 174, called "print signal," is an output lead supplying a negative pulse signal to actuate a digital printer decoder to cause a print out of data being entered into the printer. Terminal 176 is the 10-volt regulated output of the voltage regulator. It supplies source power to the transmitting unit A and to some decoding units requiring continuous, regulated, voltage. Terminal 178 is the output lead from the receive power switch 148 and supplies power to the receiving ring counter 152, the tone detector(s), receive control gates, and other decoding circuitry required by specific applications. Terminal 180, called "bias," supplies an offset bias voltage for the receive ring counter PNP transistors to insure proper turn off. Terminal 181, called "reset," is an input lead to the preset stage to provide a reset when recycling of the ring counter is required to provide more than five time slots through a scanner card. A negative pulse from the step/stop terminal of the ring counter resets the preset stage. Terminal 182, called "step" is the preset stage output which establishes the first stage of the receive ring counter in a condition to respond to the tone detector pulse assigned to the address. Terminal 183, called "non-address step," is an output terminal supplying the negative drive pulse to the receive ring counter first stage input in applications not involving address decoding. Control point decoding of numerous remote points utilizes sequential readout of address instead of preemptive address decoding. Terminal 184, called "read" is the output lead supplying positive pulses to all receive ring counter stages to turn off the stage that is in conduction. Terminal 186 is the common negative bus for interconnection to the common power supply and all other system circuitry. Terminal 188 is the input lead supplying all power to the equipment from an external battery or power supply.

Figure 5:
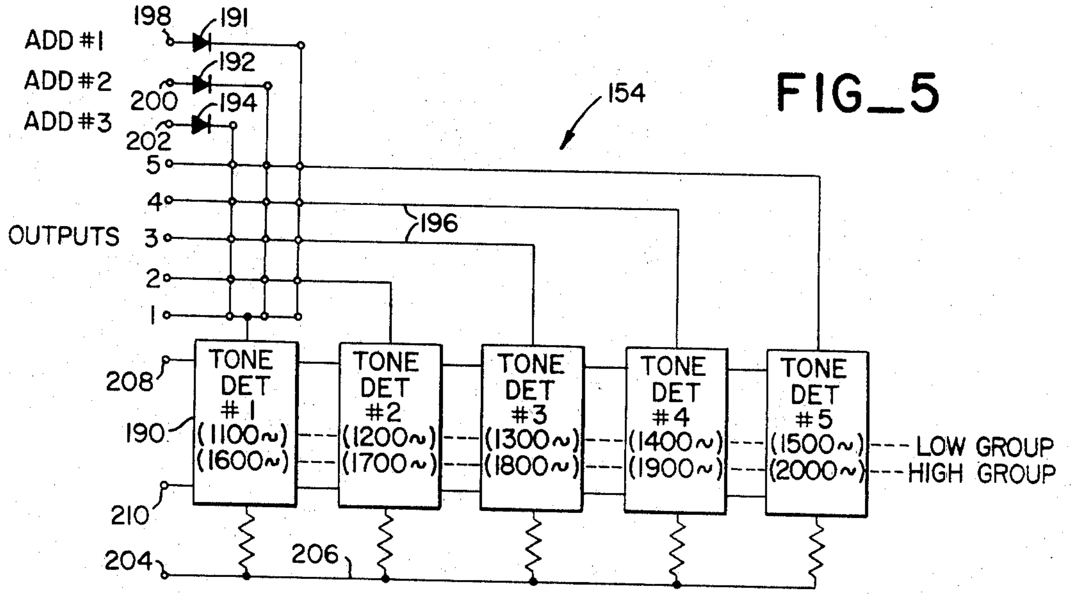
FIG. 5 is a schematic diagram of a tone detector board according to the invention.

The tone detector board—FIG. 5

The function tones that are generated between the synch tone bursts appear at the output of the amplifier limiter 142, 144 and are applied to the function tone detector board 154. A typical function tone detector board according to the invention as shown schematically in FIG. 5, contains five detector circuits each represented by a block 190. These circuits are identical except for the resonant frequencies of their LC circuits, and they are preferably available with two different sets of frequency allocations, low group and high group. Typical frequencies for each are indicated on the drawing.

In the sequence of operation as previously described, one or more of the first time slots generated by the ring counter 152 will be preprogrammed for a specific address which will establish the location at which a particular function is to be performed. This address is a part of the interconnected decoding logic 160 and consists of a direct strapping between the desired function tone detectors and the one or more specific time slots allocated. Thus, for a total of 10 specific addresses, only the first time slot would be used, there being 10 tones which can be detected for that time slot. For a total of 100 specific locations, time slots 1 and 2 would be used. For 100 up to 1,000 specific address locations time slots 1, 2 and 3 would be used for specific address identification, etc., there being no limit to the number of specific addresses which can be applied to the system. Each time slot used in this manner represents one digit of a possibly multidigit number. Illustratively, if 100,000 specific address locations were required, all of the outputs of a five-stage ring counter would be used for address purposes. In the example shown in FIG. 5, the first three time slots are utilized for address identification. Thus, three diodes 191, 192 and 194 are provided in the address leads 1, 2 and 3, respectively, which are strapped individually to the output leads 196 of selected tone detectors 190 and are also connected to an associated ring counter 152. The terminals 198, 200 and 202 of the address leads 1, 2 and 3 are connected directly to the ring counter board 152 which is shown schematically in FIG. 7, and they provide that in order for a ring counter stage to advance with the trailing edge of a burst of synch tone, the succeeding tone must be one of those which has been programmed through this interconnection. In other words, the negative voltage from the selected tone detector assigned to the particular address function must be present or there is no means of stepping the ring counter to its following stage. The incoming signal to the tone detector board 154 is provided at a terminal 204 through a common input lead 206 to all of the tone detectors 190 in the board, and the outputs from the five dectectors are indicated at the pins which are numbered from 1 to 5. The terminals 208 and 210 provide positive power from the receive power control 148 and a connection to common negative line, respectively.

Figure 6:
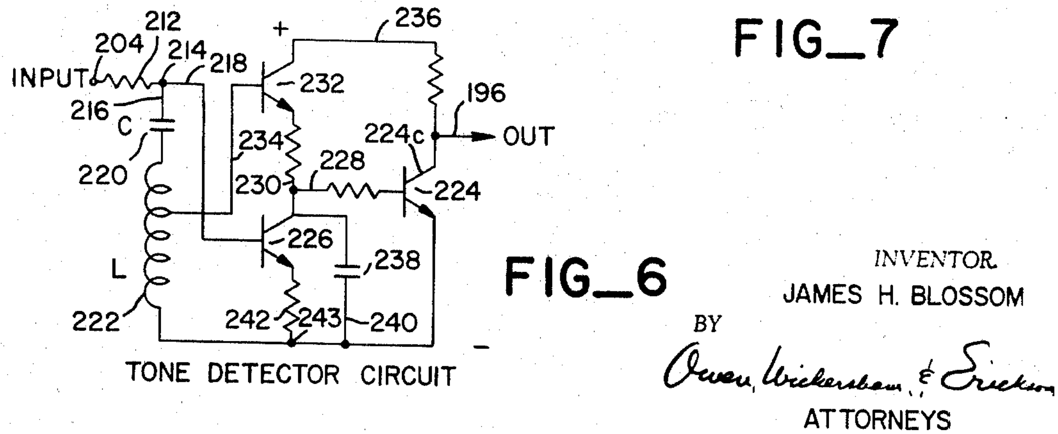
FIG. 6 is a detailed circuit diagram for a tone detector circuit.

The operation of each individual tone detector circuit 190 may be best understood with reference to FIG. 6. In this circuit the input signal is supplied at the terminal 204 and is fed through a resistor 212 to a junction 214 from which extend two leads 216 and 218. A capacitor 220 and an inductance 222 forming an LC combination are connected in series in the lead 216 which is also connected to the emitter of a transistor 224 and to the common negative line. The lead 218 is connected to the base of another transistor 226 whose collector is connected by a lead 228 to the base of the transistor 224 and by a lead 230 to another transistor 232. A lead 234 from a preselected tap on the inductance 222 is connected to the base of the transistor 232 whose collector is connected to positive potential and by a lead 236 to the collector of the transistor 224. The transistor 224 is originally non-conducting because the transistor 232, connected thereto is also non-conducting and provides no turn-on bias or positive voltage. If the transistor 232 becomes conducting, it will charge up a storage capacitor 238 in a lead 240 interconnecting the collector of the transistor 226 and the lead 230. This will cause the transistor 224 to saturate and connect its output lead to the negative side. This will happen, however, only so long as the transistor 226 remains non-conducting. If transistor 226 becomes conducting, the positive base bias through the base lead 228 to the transistor 224 can never become high enough in value to cause conduction.

Turning to a more detailed description of my tone detector circuit, the output transistor 224 receives forward base bias from the charge in the storage capacitor 238 and saturates to provide a negative going pulse at its collector 224C. The signal input at the terminal 204 to the tone detector is a square wave voltage of limited amplitude. At resonance, a high amplitude sine wave is derived from an integrating resonant rise effect of the tuned circuit and is impressed on the base of the transistor 232 causing it to conduct as an emitter follower and charge the capacitor 238. This charging current falls rapidly as the frequency shifts from resonance.

To limit the band width of the detector and to provide positive, rapid turn-off in the presence of out-of-band signals, the clamp transistor 226 is connected responsive to these signal voltages. To understand the off frequency rejection of the detector as accomplished by the out-of-band clamp transistor 226, the series circuit, comprising the resistor 242, the capacitor 220, and the inductance coil 222, may be considered as a series combination of a resistance R provided by the resistor 242, and a variable impedance Z comprised of the capacitor 220 and the inductance 222, to represent a voltage divider to the signal voltage. At resonance, the value of the impedance Z is low compared to that of the resistor 242, with the net effect being a lower voltage at the junction of the two branches containing R and Z. Off resonance signals cause the impedance Z to rise sharply with resulting higher voltage at the junction.

The base lead 218 of the transistor 226 is connected to this junction 214 and at resonant frequency, the voltage is reduced by a voltage divider action to a point below the base-emitter threshold of conduction. Transistor 226 then has no effect at resonance.

At frequencies off resonances, where the voltage divider permits higher voltage at the junction 214 and the base of transistor 226, the latter conducts heavily to discharge the capacitor 238. The relative gains of the transistors 232 and 226 are adjusted with emitter resistor values so that the output of transistor 226 is higher and consequently assumes control when out-of-band signals are present.

Characteristically, the tone detectors are set for a nominal 60–70 cycle band width, and the reception of the desired or specified tone will cause a negative output voltage to appear on its output lead 196. The tone detector circuit just described is an unusually sharp filter which helps to provide the high order of security of my system. For example, a two-cycle variation from the preselected band can cause a 5 db drop. Reception of more than one tone or any tone component outside of the normal band width will not allow the tone detector circuit to operate. It is therefore non-responsive to any type of normal interference not within the 60–70 cycle bandwidth of the desired frequency.

From the foregoing it can be seen that if a signal appearing at the terminal 204, the "signal in" junction in FIG. 5, is at the resonant frequency of a tone detector 190, it will cause operation of the particular detector and production of a negative pulse on the associated output lead. A signal at any other frequency will either not turn the transistor 232 on, or will turn on both 232 and 226, therefore, there will be no output signal on the lead 196.

With reference to FIG. 4, the presence of a specific function tone from the transmitting unit A at the input of any of the function tone detector stages will result in a negative output voltage appearing at one of its output leads 156. During this time increment there will also be a positive going voltage from one of the ring counters 152 or 152*a* apparent on one of their output leads 158. Throughout the entire cycle of operation, only one of the output leads of the ring counter stages will have a positive voltage on it at a time, and they advance in time sequentially with the synch tone bursts.

Figure 7:
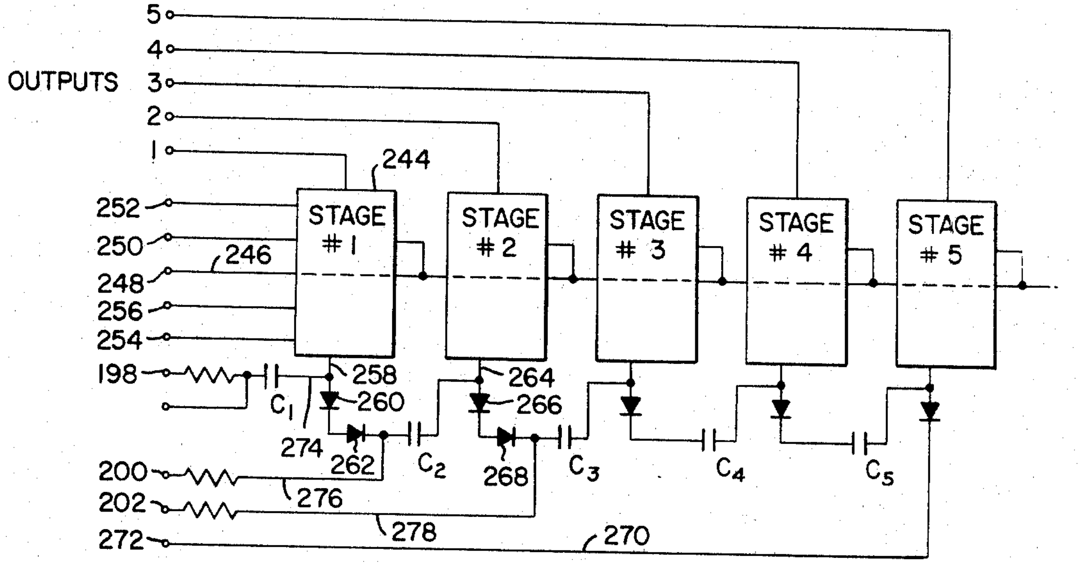
FIG. 7 is a schematic diagram of a ring counter board according to the invention.

The ring counter board—FIG. 7

The ring counter board in the embodiment shown contains five transistor switch stages which are interconnected through capacitor and diodes in a stepped cascade manner, as shown in partially block diagram form in FIG. 7. Detailed ring counter circuitry is omitted since it is well known in the art. All five of the ring counter stages 244 are connected in parallel to a lead 246 which provides a synch pulse through a terminal 248 connected to the ring counter driver 150 (FIG. 4). In the initial condition, all but the first ring counter stage (preset stage) are in a non-conducting condition. Bias and operate voltages are derived from the associated equipment and are applied at terminals 250 and 252, respectively. The terminal 254 is a negative common line (e.g., 10 volts) and terminal 256 is for receipt of a "set" pulse. Receipt of a positive synch-pulse between the terminals 254 and 248 causes the first conducting ring counter stage to turn off. The trailing edge of the synch pulse (negative going) will discharge a condenser C–1 into stage #1, thereby establishing a conducting condition and placing a positive voltage at the output marked from the first stage of the ring counter. This output is also provided on a lead 258 having a pair of diodes 260 and 262 and a charging condenser C–2 and connected to the output lead 264 of the stage #2. Receipt of the next positive synch pulse through the lead 246 will shut off stage #1. The trailing edge of the second synch pulse will advance the operation to stage #2, discharging the condenser C–2, conducting the stage #2, and charging a condenser C–3 through the lead 264 which contains a pair of diodes 266 and 268 in series. Thus, each synch pulse will discharge one condenser, charge the other, and put the associated stage into conduction, placing a positive pulse on its output lead. The ring counter will thus advance from stage to stage through five pulses. Through a stop/step lead 270 terminating at a terminal 272, depending on the application of the system, the last synch pulse to the stage #5 can either be used for turn-off or it will advance into another ring counter stage.

In the arrangement shown wherein a specific address (first three time slots) is assigned to a particular location, the condenser discharge path for each of the condensers associated with stages #1, 2 and 3 are returned to common through a tone detector output lead, preprogrammed on the tone detector board for a specific location. Thus, for stage #1 the condenser discharge path is through a lead 274 ending at the terminal 198; for stage #2 through a lead 276 ending at the terminal 200; and for stage #3 through a lead 278 ending at the terminal 202. Any time that the proper tone is not associated with the proper time (e.g., address 1, terminal 198; address 2, terminal 200; address 3, terminal 202), the ring counter ceases to advance. It, therefore, ignores any address commands not specifically addressed to the location involved.

Where the ring counter is used in non-addressed applications (transmitting or control station receive), pins 200 and 202 are strapped to the pin 248 to provide a DC discharge path for the first three capacitors. The step function from the associated driving equipment is applied to pin 198. Connected this way, the ring counter will advance with each synch-pulse.

Figure 8:
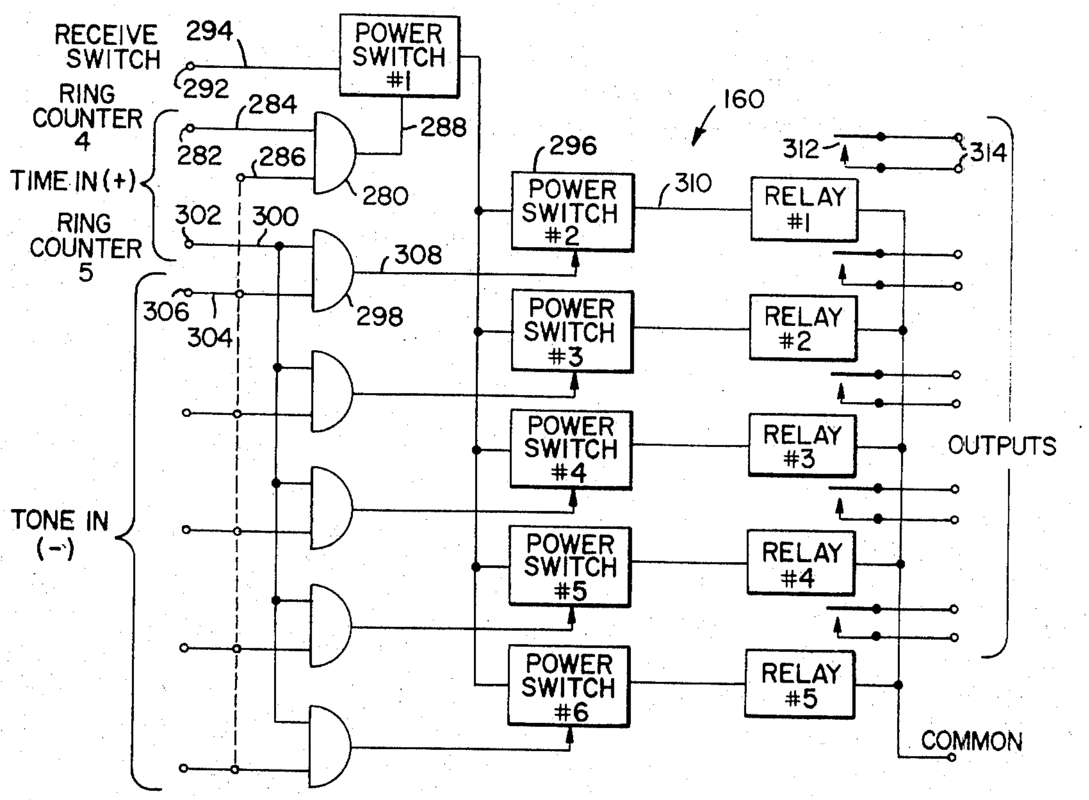
FIG. 8 is a schematic diagram of a receive control gate board according to the invention.

Receive gate control board—FIG. 8

As shown in FIG. 4, the outputs 156 of a function tone detector and the outputs 158 of the ring counter for establishing time slots are applied to the decoding logic circuit 160 or a receive control gate board. A representative block diagram of the latter is shown in FIG. 8.

This receive control gate board provides a method of interpreting the time tone signals into a usable decoded output for application to control equipment. In the application so far described wherein the first three stages of the ring counter are utilized for address purposes, the positive going output of the ring counter stage 4 and the negative going output of a tone detector 190 at the programmed frequency, must be applied to a properly tuned "and" or gate circuit 280. In other words, in order for an output to appear from the "and" circuit 280 a positive voltage must appear simultaneously on the pin 282 through a lead 284 with a negative going voltage appearing on the lead 286 from the tone detector. This will produce an output from the "and" gate 208 which through a lead 288 will close a power switch #1 and apply receive switch plus power from the terminal 292 through a lead 294 to a series of power switch circuits 296 connected in parallel. This, in effect, arms the receive control gate board 160. For an adjoining "and" gate 298 to react, it must also have a positive going voltage apparent on its input lead 300 which is derived from the ring counter stage #5 through the terminal 302 and a negative going voltage derived from associated tone detector applied through a lead 304 from a terminal 306. When the aforesaid conditions occur simultaneously, an output is produced from the "and" gate 298 through a lead 308 to a power switch #2 to conduct and, through a lead 310, to apply power to a relay #1 for a period of approximately 1 second, which through its associated contacts 312 thereby applies a DC low resistance circuit to pins 314 for application to control equipment. This explanation also applies to the other "and" gates in the receive control gate board 160. In other words, there is one receive control gate circuit required for each function that is transmitted during a command cycle. There are 5 such circuits shown in FIG. 8 with an associated arming circuit, but it is understood that additional circuits could be accommodated. Each of the "and" circuits works identically, requiring simultaneous positive and negative voltage to appear before the output can be derived from them to actuate the connected control relay.

Figure 9:
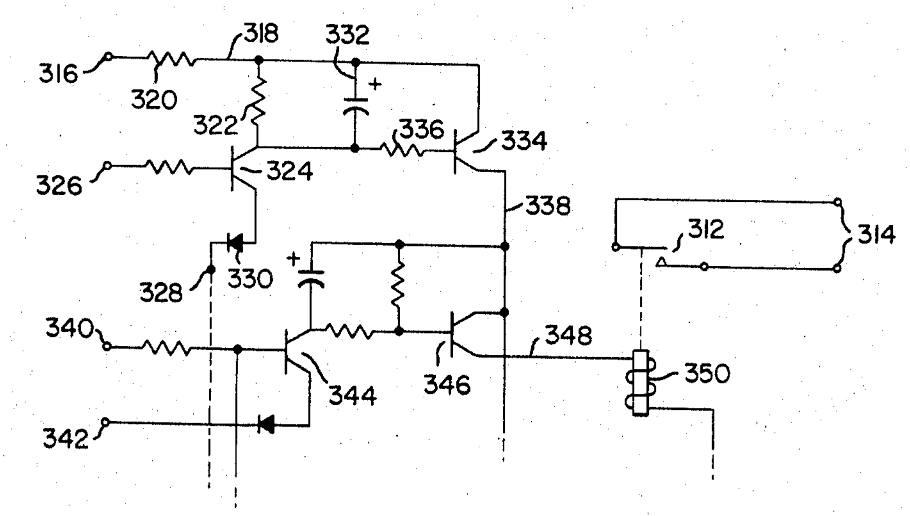
FIG. 9 is a fragmentary diagram of a portion of typical circuitry for the board shown in FIG. 8.

A portion of typical detailed circuitry for the receive control gate and relay board 160 is shown in FIG. 9 to further illustrate the operation of this phase of the system. Typical values for the components are indicated. A positive operating voltage is applied at a pin 316 through a lead 318 containing resistor 320 and through a resistor 322 to the collector of a transistor 324. Applied to the base connection of the transistor 324 is a time signal which would be a plus voltage coming in from a terminal pin 326. A negative going tone voltage is provided from a terminal pin 328 through a diode 330 to the emitter of the transistor 324. The transistor 324 which is normally in a nonconducting condition will thus be placed in a conducting condition. This causes a capacitor 332 to be charged through the resistor 322, placing a negative voltage on the base of a transistor 334 through a resistor 336 and thereby causing the transistor 334 to conduct and connect the operating voltage to a lead 338. If a second time signal and tone signal are apparent at the input terminals 340 and 342 of the next specific tone detector stage, a transistor 344 will be caused to conduct and turn the base of another transistor 346 negative, thereby causing it to conduct the voltage which was apparent on lead 338 through a lead 348 to a relay 350, thus causing the relay contacts 312 to close and thereby operating any connected equipment. Detailed circuitry from the other portions of the receive control gate board follows the general pattern shown in FIG. 9.

Figure 10:
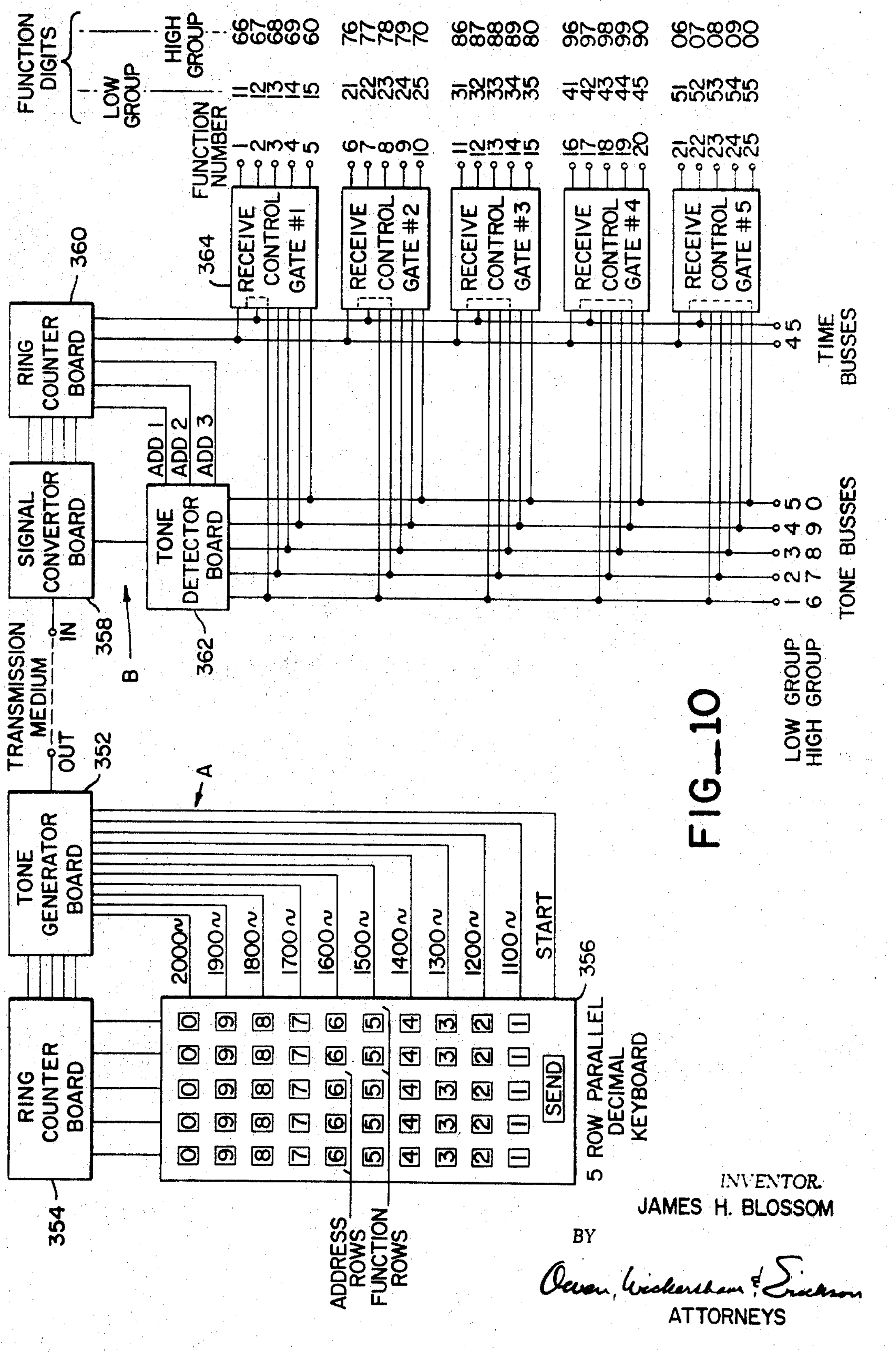
FIG. 10 is a schematic diagram of a transmission control console arrangement embodying features of the present invention.

In FIG. 10 a block diagram is shown depicting a control console for a basic remote control communication system embodying the principles of the invention. As in the arrangement shown in FIG. 1, the transmitter unit A consists of a tone generator board 352 and a five-stage ring counter board 354 of the form previously described, both interconnected by a logic encoding component which in this case is the five-row parallel output decimal keyboard 356. The latter consists of an interwired panel having five rows connected to each of the ring counter stages. Each of the 10 digits in every row is representative of and adapted to control a particular tone or frequency, as indicated.

It is apparent that with 10 digits in each row and the first three rows or stages assigned to address identification and the latter two rows assigned to function coding, this console could send up to 1,000 addresses and 100 functions when employed for maximum utilization of equipment at the remote terminals. However, in the arrangement shown, the system is divided down to provide 125 possible locations, using low group tone detectors, and 125 stations, using high group tone detectors. The reception unit B comprises a signal converter board 358 connected to a ring counter board 360 and a tone detector board 362 in the manner previously described. The decoding logic comprises a series of receive control gates 364 arranged as shown in FIG. 8. Each receive control gate provides five separate functions. The three columns of numbers shown to the right of the receive control gates indicate possible combinations of function digits that may be transmitted and decoded by the system.

Figure 11:
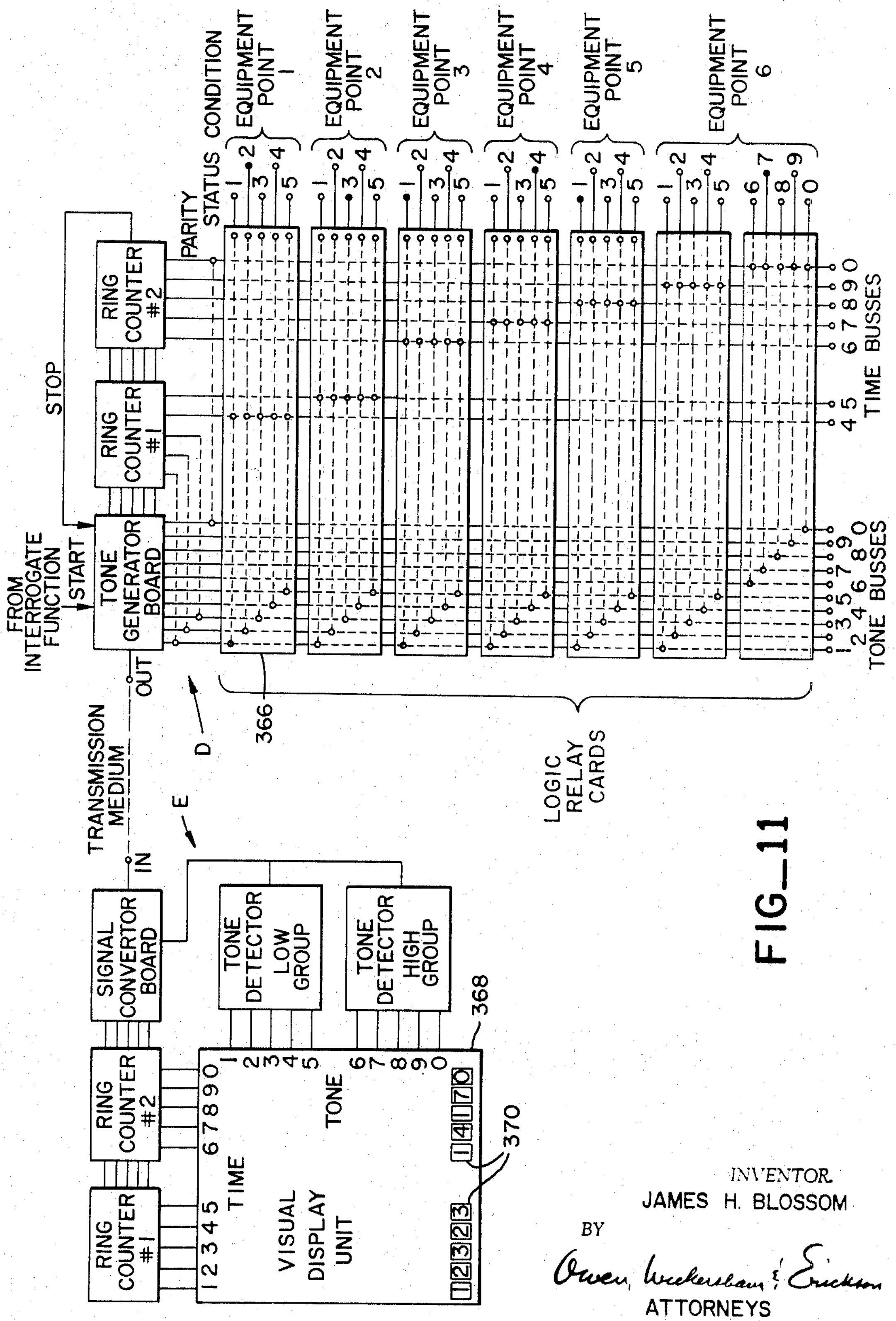
FIG. 11 is a schematic diagram showing a status reporting mode according to the present invention.

Status report transmission—FIG. 11

Another feature of my invention is that it provides a means for reporting and recording the status of various apparatus, equipment or the like, from a remote location in the field to a central monitoring station. Applying the principles of the present invention the basic mode of status reporting is similar to that of command control with one significant difference. In status reporting from a remote location, one time slot is assigned to each status reporting equipment, with the 10 available tones indicating the status condition of that particular equipment. Using the basic principles of my system, status reporting points can be incorporated by combining them with a scanner card and additional receive control gates.

In FIG. 11 is a basic system having the capability of reporting up to 10 basic status conditions per unit of controlled equipment. One logic relay circuit is required per status per point. In this illustrative arrangement the previously described tone generator board and associated ring counters are utilized in conjunction with a series of logic relay cards 366. Each logic relay card includes five logic relay circuits and has wired access to 10 tones and 10 time periods. The monitoring terminal D, as wired, assigns the first three time periods to a prewired address as previously described and the next six time periods to six reporting equipment points, as designated. The seventh time period is assigned to a parity check number which, ideally, would be a number that was unassigned for a status report.

In the aforesaid system a status report is initiated by an interrogate function command from the control or monitoring console E. At the control console which includes a signal converter connected to the tone detectors and associated ring counters the received information can either be displayed on a visual display unit 368 or it can be printed out by a ten-digit serial printer, or both. The visual display unit shown as typical will present the received information on 10 in-line decimal readout windows 370. The last status report received will remain on display until it is replaced by another.

Figure 12:
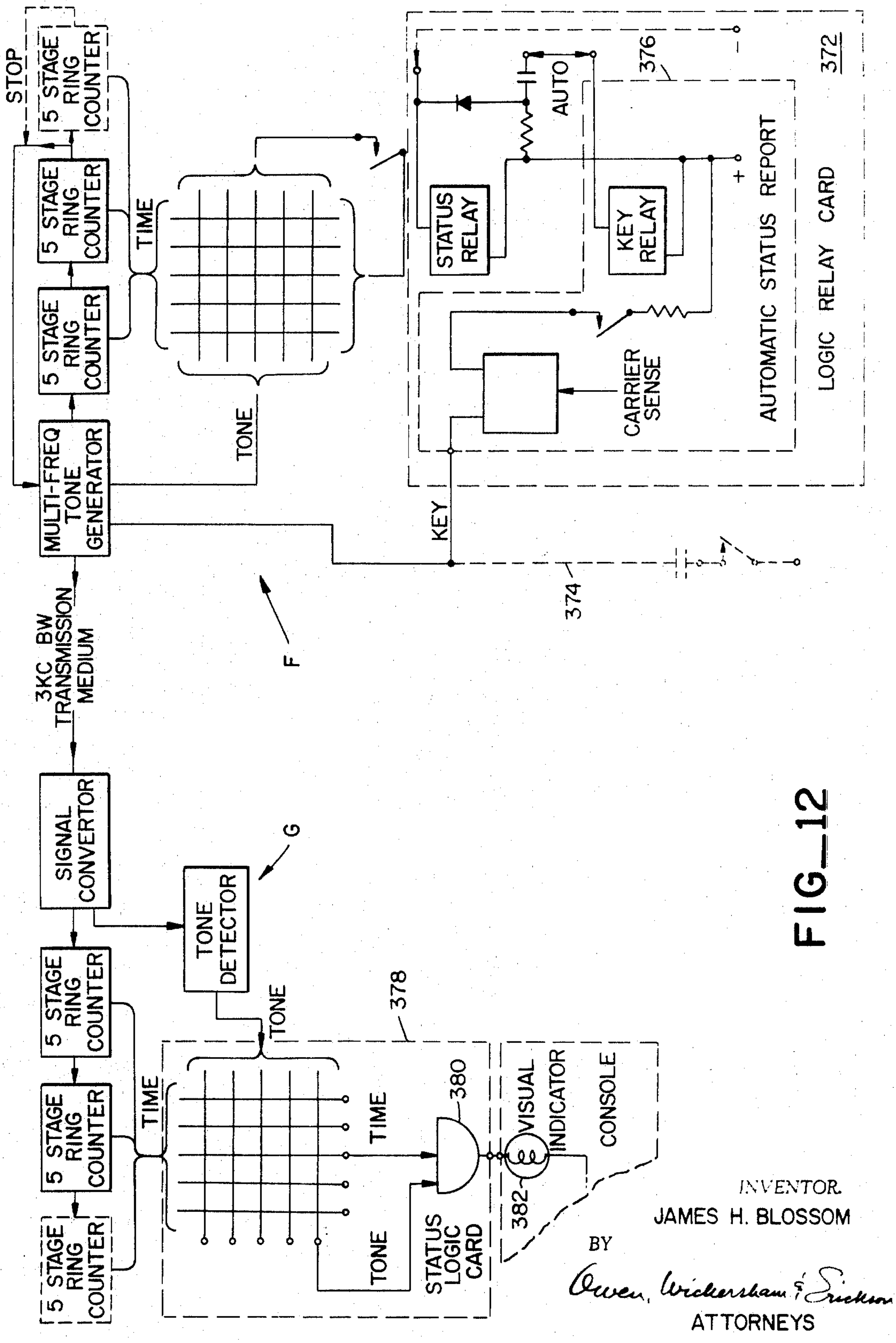
FIG. 12 is a schematic diagram showing an automatic status reporting mode according to the invention.

Automatic status reporting—FIG. 12

The schematic block diagram of FIG. 12 shows another status reporting embodiment of my system comprising a transmission unit F in the field and a monitoring station G at a central control station. At any remote location the current status condition of all status reporting points may be represented by closed contacts which actuate status relays. The latter are connected through a logic relay card matrix 372 to key the particular status tone in the time slot representing the particular equipment. A positive pulse on the key lead 374 either from an interrogate control signal or from an automatic status report card 376, will trigger the transmit signal cycle. This cycle is identical to that previously described, except for the number of time slots.

The transmit cycle will report the total status condition of a given remote location and then turn off until it is again interrogated. Again, any number of time slots may be utilized for address identification and the remaining time slots for indicating the status of each piece of monitored equipment.

One problem with automatic status, reporting heretofore related to the availability of the transmission channel at the time a status report is to be made. In the present invention this was solved by the automatic status card 376 which senses the presence of other transmissions on the circuit. As shown in FIG. 12, the status transmission unit F is in other respects similar to that shown in FIG. 11 and comprises the combination of a tone generator and associated ring counters interconnected with the logic relay card 372 which includes the automatic status report card 376. In this arrangement, if the circuit is "busy," the status card 376 stores the key pulse, which may originate from an interrogation signal or by a programtime as provided by the automatic station card, until after the circuit is cleared. As soon as the circuit is cleared, a status report is sent. The unit F also may contain circuitry which can cause the remote location to send a series of status reports to give extra insurance that the status change gets through. This sequencing is in accordance with F.C.C. approved specifications for voice frequency utilization consisting of five, five-second transmissions spaced one minute apart.

The central control or monitoring station G provides a great deal of flexibility in the presentation of received information and is comprised essentially of the same components as previously described embodiments, namely a signal converter connected to a tone detector and associated ring counters, the ring counter and tone detector outputs being fed to a status logic card 378. As in the system heretofore described, digital readout devices may be utilized and the information can be directly applied to a decimal type digital printer, or alternatively, to panel light indication. In the monitoring unit G an "and" gate circuit 380 may be adapted to receive inputs of tone and time for a particular address signal to trigger such a visual indicator 382.

Where digital information is required, such as readout of flow rates, power consumption, etc., the degree of accuracy involved is limited in the present system only by the resolving power of the transducer and the analog to digital conversion. One time slot is required per decimal column. In this case more than one time slot would probably be required for a reporting piece of equipment; for instance, to provide three-place accuracy would require three time slots. This could be taken care of by increasing the capacity or number of ring counters in the system.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method for transmitting control signals over an in-service voice frequency facility interconnecting transmitting and receiving stations and normally carrying intermittent voice frequency signals, comprising transmitting a relatively short multi-tone signal burst consisting of synchronizing tones at time spaced intervals and a coded tone of a preselected frequency different from the synchronizing tone frequency between consecutive synchronizing tones, and decoding the multi-tone signal burst at the receiving station only if the amplitude of each synchronizing tone of the burst signal exceeds the level of any other signal on the voice frequency facility which is present during the time interval of the signal burst.

2. A method for transmitting remote control signals on a share time basis over an in-service voice frequency facility interconnecting a transmitting station and a receiving station comprising the steps of:

transmitting a series of synchronizing signals of a preselected frequency at spaced apart intervals, thereby forming time slots in a multi-tone burst;

preselecting a series of code signals of different frequencies at the transmitting unit;

transmitting said code signals in a predetermined sequence in said time slots between synchronizing signals;

decoding the multi-tone burst at the receiving station only if the amplitude of each synchronizing tone of signal exceeds the level of any other signal on the voice frequency facility which is present during the time interval of the signal burst;

producing a control signal at the receiving unit in response to the receipt of multi-tone burst having synchronizing signals and code signals combined sequentially in a predetermined time and frequency arrangement.

3. A method for transmitting remote control signals providing an in-service voice frequency facility normally carrying intermittent voice frequency signals between said stations from a transmitting unit to a receiving unit comprising the steps of:

transmitting from the transmitting unit a series of synchronizing signals having a preselected frequency and spaced apart at intervals, thereby forming time slots between said signals;

preselecting a series of code signals of different frequencies at the transmitting unit;

transmitting said code signals in a predetermined sequence in said time slots, each code signal following a synchronizing signal, thereby forming a multi-tone burst of synchronizing and code signals;

amplifying the incoming signals up to a predetermined level at the receiving unit;

detecting the synchronizing signals at the receiving unit to provide a time base reference;

providing a power control circuit operative in response to receipt of synchronizing signals at predetermined intervals;

detecting the transmitted code signals;

comparing a detected code signal in conjunction with a particular time slot interval and producing an output control signal when the appropriate predetermined code signal is received in the proper preselected time slot, and rendering said power control circuit inoperative whenever any one of said synchronizing signals is not a predetermined value greater than the amplitude of any other signal on said voice frequency facility that is detected simultaneously therewith.

4. The method of claim 3 including the steps of:

generating from said receiving unit a series of code status signals in response to the entire multi-tone burst from said transmitting unit related to the address or operational status of apparatus being remotely controlled near said receiving unit;

generating a series of synchronizing signals at time spaced intervals and transmitting a multi-tone burst including synchronizing tones alternating with code status tones arranged in a predetermined sequential order from said receiving unit;

providing a visual display of decoded status signals at the transmitting unit which are received in the proper time interval sequence from the receiving unit.

5. The method of claim 4 wherein the synchronizing tones sent from the transmitting unit are at a different frequency from the synchronizing tones transmitted from the receiving unit.

6. A method for reporting status data from a remote station over a voice frequency facility normally carrying intermittent voice frequency signals to a monitoring station, comprising the steps of:

generating a series of synchronizing tones at time spaced intervals from a transmitting unit near the remote station;

generating a plurality of code tones having frequencies related to an identifying address and the status data to be transmitted;

transmitting a multi-tone burst including synchronizing tones with code tones arranged in a predetermined sequential order between the synchronizing tones;

receiving the multi-tone burst at the monitoring station and detecting the correct address identification and status data by a predetermined relationship of the synchronizing tones and the code tones; and producing an error signal at the monitoring station for discontinuing the detection of burst signals if any one of said synchronizing tones is not a predetermined value greater than the amplitude of any other signal on the voice frequency facility detected simultaneously therewith.

7. The method as described in claim 6 including the steps of transmitting an interrogating signal from a monitoring station to initiate the status data signals from the remote station.

8. The status reporting method as described in claim 6 including the steps of sensing the presence of other transmission on the voice frequency facility;

providing a key pulse from the remote station in response thereat for initiating a multi-tone burst from the remote station;

storing the key pulse for initiating a multi-tone burst if the voice facility is "busy" and sending the burst when the facility is free from other transmission.

9. For use in combination with a voice frequency communication facility normally carrying intermittent voice frequency signals interconnecting a transmitting station and a receiving station located remotely therefrom, a control system for utilizing the voice frequency facility comprising:

a multi-tone generator means connected to the voice frequency facility at the transmitting station including a time base circuit for transmitting a series of intermittent synchronizing signals at predetermined time spaced intervals, thereby establishing time slots forming a time division system;

means for causing said generator means to produce function tones of desired frequencies and in a predetermined sequential order at time intervals within said time slots;

a limiter amplifier at the receiving station for providing a constant amplitude output signal over a range of amplitudes at its input;

a synchronizing tone detector connected to said amplifier for detecting the presence of the synchronized signals from said multi-tone generator means and for providing a positive driven synchronized time based signal at its output;

ring counter means operable in response to said time base signal generated by the synchronizing tone detector for providing time slots in absolute timed coincidence with said time slots transmitted by the transmitting tone generator means;

means connected in parallel with said synchronizing tone detector for detecting individually the specific function tone frequencies transmitted from the transmitting generator means;

means for comparing the detected tone signals with preselected tone signals transmitted in the time slots and for producing an output signal when the received synchronizing signals are combined with the proper preselected function tone signals;

and means for rendering said ring counter means inoperative if any one of said synchronizing signals is not a predetermined amplitude greater than the amplitude of any other signal on the voice frequency facility detected simultaneous therewith.

10. For use in combination with a voice frequency communication facility including a transmitting station and a receiving station located remotely therefrom, a tone signaling system comprising:

a multi-tone generator means at the transmitting station including a time base circuit for transmitting a series of intermittent synchronized signals at predetermined time spaced intervals, thereby establishing time slots forming a time division system;

means for causing said generator means to produce function tones of different preselected frequencies;

a first ring counter for transmitting the preselected function tones in a predetermined sequential order at time intervals within said time slots, thereby forming a multi-tone coded transmission burst;

a limiter amplifier at the receiving station for receiving said multi-tone burst and providing a constant amplitude output signal over a range of amplitudes at its input;

a synchronizing tone detector connected to said limiter amplifier for detecting the presence of the synchronized signals from the multi-tone generator means and for providing a positive driven synchronized time based signal at its output;

a second ring counter operable in response to said time base signal generated by the synchronizing tone detector for providing time slots in absolute timed coincidence with said time slots transmitted by the transmitting tone generator means;

a function tone detector connected in parallel with said synchronizing tone detector for detecting individually the specific frequencies transmitted from the transmitting generator means;

and receive control gate means for comparing the detected tone signals with preselected tone signals transmitted in the time slots and for producing an output signal.

11. A signal transmitter for sending a series of voice frequency signals at the time spaced intervals in a predetermined sequence comprising in combination:

means for applying power in response to an external signal to initiate a transmit cycle;

time base generator means connected to said latter means for providing a series of intermittent pulses;

tone generator means for producing a plurality of individual function tones of different frequencies and a synchronizing tone of one preselected frequency;

means connecting said time base generator means to said tone generator means and responsive to each intermittent pulse for controlling the alternate transmission of synchronizing tones and function tones, said latter means including a programmable encoding logic means for assigning a code digit or symbol to a function tone having a particular frequency;

ring counter means responsive to said time base generator means for providing pulses at predetermined spaced apart intervals and connected to said tone generator to produce function tones at preselected frequencies in time slots between synchronized tones and in the sequential order programmed by said encoding logic;

coupling means associated with said tone generator for transmitting the synchronized tone signals and the function tone signals alternately in a multi-tone burst.

12. A signal transmitter for sending a series of voice frequency signals at predetermined time intervals comprising in combination:

a transmit power circuit means for applying power in response to an external signal to initiate a transmit cycle;

time base generator means connected to said power circuit for providing a series of intermittent pulses;

an oscillator circuit means for producing a sine wave tone signal;

tone generator means connected to said oscillator circuit means capable of producing a plurality of individual tones of different frequencies;

synchronized tone switch means connected to said tone generator means for producing a synchronized tone of a predetermined frequency;

means connected to said power circuit means and to said time base generator means and thereby responsive to each intermittent pulse for controlling the duty cycle of the synchronized switch means;

means associated with said tone generator means for producing preselected function tones of different frequencies;

a programmable logic encoding means for assigning a code digit or symbol to a function tone having a particular frequency including ring counter connected to said power circuit and responsive to said time base generator means for providing pulses at predetermined spaced apart intervals to the programmed logic encoding means and said tone generator to produce function tones at preselected frequencies and alternately with the synchronized tones;

coupling means associated with said tone generator for transmitting the synchronized tone signals and the function tone signals alternately;

whereby preselected function tone signals are transmitted in a preselected sequence as well as a time scale relationship with the synchronization tones.

13. The signal transmitter as described in claim 12 wherein said means for controlling the duty cycle of the synchronized switch means is a monostable multivibrator.

14. The signal transmitter as described in claim 12 wherein said means for producing preselected function tones comprises a tap coil and a series of transistor switches connected at preselected taps on said coil to provide the desired tone frequencies.

15. The signal transmitter as described in claim 12 wherein said time base generator is a unijunction relaxation oscillator.

16. A signal transmitter apparatus for sending a series of voice frequency signals at predetermined time intervals comprising in combination:

a transmit power means for applying power in response to an external signal to initiate a transmit cycle;

time base generator means connected to said power means for providing a series of intermittent pulses;

an oscillator circuit means for producing a sine wave tone signal;

tone generator means connected to said oscillator circuit means capable of producing a plurality of individual function tones of different frequencies;

switch means connected to said tone generator means for producing a synchronizing tone of a predetermined frequency;

multivibrator means connected to said power means and to said time base generator means and thereby responsive to each intermittent pulse for controlling the duty cycle of the synchronizing tone switch means;

a programmable logic encoding means for assigning a code digit or symbol to a function tone having a particular frequency;

a plurality of transistor switches associated with said tone generator means, each being base connected to said encoding means for producing preselected function tones of different frequencies;

a ring counter connected to said power means and responsive to said time base generator means for providing pulses at predetermined spaced apart intervals to the programmed logic encoding means and to said tone generator to produce function tones at preselected frequencies and alternately with the synchronized tones;

coupling means associated with said tone generator for transmitting the synchronized tone signals and the function tone signals alternately;

whereby preselected function tone signals are transmitted in a preselected sequence as well as a time scale relationship with the synchronization tones.

17. The apparatus as described in claim 16 including a diode gate for each said transistor switch in a lead connected to the base lead of each transistor switch and to said multivibrator, whereby said function tones are clamped off while synchronizing tones are being transmitted.

18. A signal receiving apparatus for a remote control system utilizing an in-service voice frequency facility for transmitting coded multi-tone bursts comprised of synch tones and function tones in alternating sequence, said apparatus comprising:

amplifier means for receiving a multi-tone burst;

power control means;

ring counter means;

a synch tone detector connected to the output of said amplifier means for providing a pulse to said power control means for every synch tone received, ring counter means connected to said power control means and to a ring counter driver means, the latter being connected to and driven by said synch tone detector to drive the ring counter means in a stepping manner;

a function tone detector connected to said power control means in parallel with said synch tone detector and to said amplifier means for producing an output signal upon receipt of an input function tone of a predetermined frequency;

and decoding logic means connected to said ring counter means and to said function tone detector for receiving said function tones and alternate synch tones and providing output signals to control apparatus when a multi-tone burst of synch tones and function tones of the appropriate frequencies and sequential order are received.

19. The apparatus as described in claim 18 wherein said decoding logic means comprises a receive control gate board including a series of receive control gates each responsive to a positive pulse from said ring counter means and a negative pulse from said function tone detector to produce an output signal for application to apparatus being controlled.

20. A system for transmitting multi-tone signal bursts from a transmitting station to a receiver station with a high degree of signal to noise immunity, said system normally carrying intermittent voice frequency signals comprising:

means for transmitting a burst a plurality of synchronizing signals of a predetermined frequency, time duration and time separation;

means for transmitting information signals between said synchronizing signals, said information signals having a different frequency than said synchronizing signals, a receiver unit at said receiver station including means for detecting said synchronizing and information signals and for comparing the level of each of said synchronizing and information signals with any other voice frequency signals or noise detected simultaneously therewith; and means for producing a predetermined error indication at the receiver unit when one of said synchronizing signals is not a predetermined value in amplitude greater than the amplitude of said other signals detected simultaneously therewith.

21. The system as described in claim 20 wherein said means for transmitting synchronizing signals includes a first ring counter and said receiver unit includes a second ring counter which is stepped by and in synchronism with said first ring counter.

22. The system as described in claim 21 including means for utilizing said error indication for deactivating said second ring counter and returning it to its initial state and prepared for receiving another burst of signals.

23. The system as described in claim 20 wherein said means for producing a predetermined error indication comprises a tone detecting circuit including:

first and second leads branching from a junction that receives the input signal;

a capacitor and an inductor in series providing an impedance Z in said first lead and a resistor R in said second lead, said branching leads forming a voltage divider;

a tap on said capacitor for establishing the resonant frequency of the circuit;

a storage capacitor;

means connected to said tap for charging the storage capacitor to produce an output signal when the circuit is in resonance;

and means connected to said voltage divider for discharging said storage capacitor to prevent an output signal and provide a sharp cut-off at input frequencies that are off the resonance frequency for the circuit.

References Cited

UNITED STATES PATENTS

| | | | |
|---|---|---|---|
| 2,554,886 | 5/1951 | Stedman et al. | 178—69.5 X |
| 2,967,234 | 1/1961 | Piazza | 325—30 |
| 3,037,078 | 5/1962 | Higgins et al. | |
| 3,047,662 | 7/1962 | Smith | 340—151 X |
| 3,289,152 | 11/1966 | McIlwraith et al. | 325—30 X |

ROBERT L. GRIFFIN, Primary Examiner

J. A. BRODSKY, Assistant Examiner

U.S. Cl. X.R.

178—66; 325—30; 340—147, 171